(12) United States Patent
Lee et al.

(10) Patent No.: US 9,691,350 B2
(45) Date of Patent: Jun. 27, 2017

(54) DISPLAY APPARATUS INCLUDING LIGHT CONTROLLING PARTS AND METHOD OF DRIVING THE SAME

(71) Applicant: Samsung Display Co., LTD., Yongin, Gyeonggi-Do (KR)

(72) Inventors: Seung-Hoon Lee, Hwaseong-si (KR); Hae-Young Yun, Suwon-si (KR); Tae-Hyeong Park, Yongin-si (KR); Kyung-Ho Jung, Seongnam-si (KR); Jin-Hwan Kim, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 580 days.

(21) Appl. No.: 13/834,194

(22) Filed: Mar. 15, 2013

(65) Prior Publication Data

US 2014/0118412 A1   May 1, 2014

(30) Foreign Application Priority Data

Oct. 26, 2012  (KR) .................. 10-2012-0120037

(51) Int. Cl.
*H04N 13/04* (2006.01)
*G09G 5/10* (2006.01)
*F21V 9/08* (2006.01)
*G02B 27/22* (2006.01)

(52) U.S. Cl.
CPC .............. *G09G 5/10* (2013.01); *F21V 9/08* (2013.01); *H04N 13/0404* (2013.01); *H04N 13/0415* (2013.01); *H04N 13/0447* (2013.01); *G02B 27/2214* (2013.01); *H04N 13/0422* (2013.01)

(58) Field of Classification Search
CPC .......... H04N 13/0404; H04N 13/0415; G02B 27/2214
USPC ............... 345/419; 348/51; 349/15; 359/463
See application file for complete search history.

(56) References Cited

U.S. PATENT DOCUMENTS

| 6,064,424 | A | 5/2000 | Van Berkel et al. |
| 6,118,584 | A | 9/2000 | Van Berkel et al. |
| 7,787,008 | B2 | 8/2010 | Fukushima et al. |
| 8,063,931 | B2 | 11/2011 | Saishu et al. |
| 8,233,036 | B2 * | 7/2012 | Park .................. H04N 13/0404 345/419 |
| 9,190,022 | B2 | 11/2015 | Yun et al. |

(Continued)

FOREIGN PATENT DOCUMENTS

| CN | 100410728 C | 8/2008 |
| CN | 102014289 A | 4/2011 |

(Continued)

*Primary Examiner* — Chanh Nguyen
*Assistant Examiner* — Yuzhen Shen
(74) *Attorney, Agent, or Firm* — Cantor Colburn LLP

(57) ABSTRACT

A display apparatus includes: a pixel part including a plurality of pixels arranged substantially in a matrix form, where the matrix form includes a unit matrix having X columns in a horizontal direction and Y rows in a vertical direction, where X and Y are natural numbers; and a plurality of light controlling parts inclined with respect to the vertical direction of the pixels on the pixel part at an inclined angle of θ, where the inclined angle of θ satisfies the following equation: $\theta = \tan^{-1}((M \times X)/(N \times Y))$, where M and N are different natural numbers.

18 Claims, 11 Drawing Sheets

(56) References Cited

U.S. PATENT DOCUMENTS

| | | | |
|---|---|---|---|
| 2009/0262420 A1* | 10/2009 | Yun | H04N 13/0404 359/463 |
| 2010/0259697 A1* | 10/2010 | Sakamoto | G02B 27/2214 349/15 |
| 2011/0032438 A1* | 2/2011 | Yun | H04N 13/0415 349/15 |
| 2011/0050683 A1* | 3/2011 | Yun | G02B 27/2214 345/214 |
| 2011/0102423 A1* | 5/2011 | Nam | H04N 13/0404 345/419 |
| 2011/0164318 A1* | 7/2011 | Yun | G02B 27/2214 359/463 |
| 2012/0062990 A1 | 3/2012 | Okamoto | |
| 2013/0208357 A1 | 8/2013 | Saito | |

FOREIGN PATENT DOCUMENTS

| | | |
|---|---|---|
| EP | 0762177 A2 | 3/1997 |
| EP | 1752813 A1 | 2/2007 |
| EP | 566683 B1 | 12/2008 |
| JP | 9133893 A | 5/1997 |
| JP | 201153647 A | 3/2011 |
| JP | 201258599 A | 3/2012 |
| JP | 201278696 A | 4/2012 |

\* cited by examiner

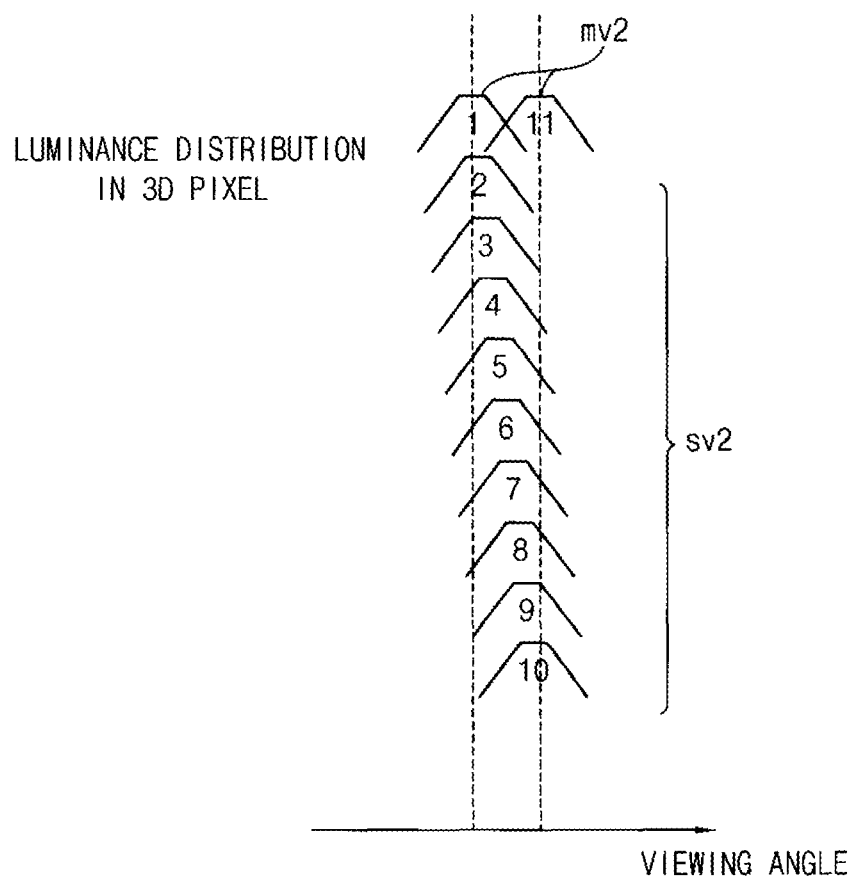

DISPLAY APPARATUS INCLUDING LIGHT CONTROLLING PARTS AND METHOD OF DRIVING THE SAME

This application claims priority to Korean Patent Application No. 10-2012-0120037, filed on Oct. 26, 2012, and all the benefits accruing therefrom under 35 U.S.C. §119, the content of which in its entirety is hereby incorporated by reference.

BACKGROUND

1. Field

Exemplary embodiments of the invention relate to a display apparatus and a method of driving the display apparatus. More particularly, exemplary embodiments of the invention relate to a display apparatus that displays a three-dimensional ("3-D") image and a method of driving the display apparatus.

2. Description of the Related Art

A 3-D display apparatus without glasses may be classified into various types. The 3-D display apparatus may use a light control device that divides light on a plurality of pixels arranged in two-dimension so that different images are displayed in view points of a viewer.

When the 3-D display apparatus does not include the glasses, the image is discontinuously displayed on the eyes of the viewer. When the 3-D image apparatus displays different images in every view point of the viewer, the different images may not be fully displayed or a black image may be displayed at a boundary position, such that a ripple mark (also referred to as "Moire") may be displayed to the viewer.

SUMMARY

Exemplary embodiments of the invention provide a 3-dimensional ("3-D") display apparatus with improved luminance uniformity of images in a view point.

Exemplary embodiments of the invention also provide a method of driving the 3-D display apparatus.

According to an exemplary embodiment of the invention, a display apparatus includes: a pixel part including a plurality of pixels arranged substantially in a matrix form, where the matrix form includes a unit matrix having X columns in a horizontal direction and Y rows in a vertical direction, where X and Y are natural numbers; and a plurality of light controlling parts inclined with respect to the vertical direction of the pixels on the pixel part at an inclined angle of θ, where the inclined angle of θ satisfies the following equation: $\theta = \tan^{-1}((M \times X)/(N \times Y))$, where M and N are different natural numbers.

In an exemplary embodiment, M/N may be greater than zero (0) and less than or equal to about ⅓.

In an exemplary embodiment, M and N may be pairwise disjoint.

In an exemplary embodiment, a ratio of M with respect to N may be about 1:3.

In an exemplary embodiment, a ratio of X with respect to Y may be about 9:11.

In an exemplary embodiment, a ratio of X×M with respect to Y×N may be about 3:11.

In an exemplary embodiment, each pixel of the pixel part may have a substantially rectangular shape extending in the vertical direction.

In an exemplary embodiment, a ratio of a horizontal length with respect to a vertical length of the each pixel of the pixel part may be about 1:3.

In an exemplary embodiment, the pixel part may be spaced apart from the light controlling part.

In an exemplary embodiment, the light controlling parts may be arranged substantially parallel to each other.

In an exemplary embodiment, each of the light controlling parts may include a bottom portion and a curved portion disposed on the bottom portion.

In an exemplary embodiment, the light controlling part may further include a flat portion disposed on the curved portion.

In an exemplary embodiment, each of the light controlling parts may include a bottom portion, a side flat portion and an upper flat portion.

In an exemplary embodiment, the display apparatus may further include a diffusion plate interposed between the pixel part and the light controlling parts.

According to another exemplary embodiment of the invention, a method of driving a display apparatus displaying a main view point image on a pixel in a main row of a unit matrix; and displaying a sub view point image on pixels in sub rows of the unit matrix, where the sub rows are remaining rows of the unit matrix except the main row, where the display apparatus includes: a pixel part including a plurality of pixels arranged substantially in a matrix form, where the matrix form includes the unit matrix having X columns in a horizontal direction and Y rows in a vertical direction, and X and Y are natural numbers; and a plurality of light controlling parts inclined with respect to the vertical direction of the pixels on the pixel part by an inclined angle of θ.

In an exemplary embodiment, the main row may be a first row of the unit matrix.

In an exemplary embodiment, pixels which display the sub view point image may be disposed along an imaginary line passing a pixel which displays the main view point image in the main row and inclined with respect to vertical direction by the inclined angle of θ.

In an exemplary embodiment, the inclined angle of θ may satisfy the following equation: $\theta = \tan - 1((M \times X)/(N \times Y))$, where M and N are different natural numbers.

In an exemplary embodiment, a ratio of M with respect to N may be about 1:3.

In an exemplary embodiment, a ratio of X with respect to Y may be about 9:11.

In an exemplary embodiment, a ratio of X×M with respect to Y×N may be about 3:11.

According to exemplary embodiments of the invention, the 3-D display apparatus includes the pixel part and the light controlling part inclined with respect to the pixel part by a predetermined angle. In such embodiment, the light controlling part controls the image period of the image displayed to the viewer to be substantially continuously changed with respect to each view point such that the image displayed to the viewer has substantially uniform luminance distribution. Thus, Moire is effectively prevented from being recognized by a viewer.

In such embodiments, the image at the main view point and the image at the sub view point are simultaneously displayed to the viewer, such that the viewer may not perceive the change of luminance in different view points, and image display quality is thereby substantially improved.

BRIEF DESCRIPTION OF THE DRAWINGS

The above and other features of the invention will become more apparent by describing in detailed exemplary embodiments thereof with reference to the accompanying drawings, in which:

FIG. 6 is a graph illustrating luminance distribution of the display apparatus of FIG. 5;

DETAILED DESCRIPTION

Figure 1:
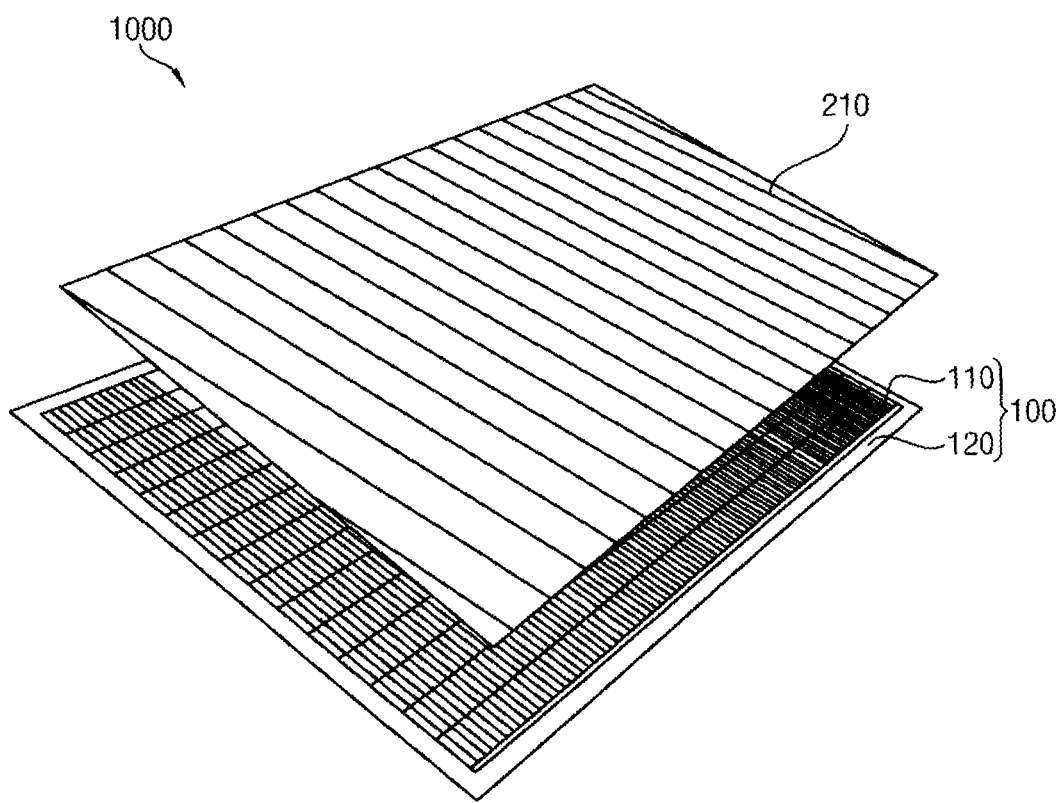
FIG. 1 is a perspective view of an exemplary embodiment of a display apparatus according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein Hereinafter, exemplary embodiments of the invention will be described in detail with reference to the accompanying drawings.

FIG. 1 is a perspective view illustrating an exemplary embodiment of a display apparatus according to the invention.

Referring to FIG. 1, in an exemplary embodiment, the display apparatus 1000 includes a pixel part 100 and a plurality of light controlling parts 210. The pixel part 100 includes a plurality of pixels 110 and a peripheral part 120. Light corresponding to images displayed by the pixel part 100 passes through the light controlling parts 210 and perceived by a viewer. Different images with respect to view points of the viewer are displayed to the viewer, thereby displaying a 3-dimensional ("3-D") image.

The light controlling parts 210 are arranged substantially parallel to each other, and extend in a direction inclined with respect to a vertical direction of the pixel part 100 by a predetermined angle. When the light controlling parts 210 are substantially parallel to the vertical direction of the pixel part 100, a region of the pixel part 100, in which the pixels 110 are not disposed, may be exposed to the viewer such that Moire may be displayed to the viewer. In an exemplary embodiment, the light controlling parts 210 are inclined with respect to the vertical direction of the pixel part 100 by the predetermined angle. In an exemplary embodiment, a portion of the light controlling parts 210 may overlap a black matrix region, in which the pixels 110 of the pixel part 100 are not disposed, and another portion of the light controlling parts 210 may not overlap the black matrix region, thereby effectively preventing Moire. In such an embodiment, the controlling parts 210 may be alternately disposed in the matrix region. In such an embodiment, the controlling parts 210 may be alternately disposed in the matrix region in a random arrangement. However, although the light controlling parts 210 may include a portion that is disposed in the black matrix region and a portion that is not disposed in the black matrix region, Moire may be partially displayed to the viewer when the light controlling parts 210 are substantially uniformly arranged with respect to the pixels 110 of the pixel part 100.

Figure 2:
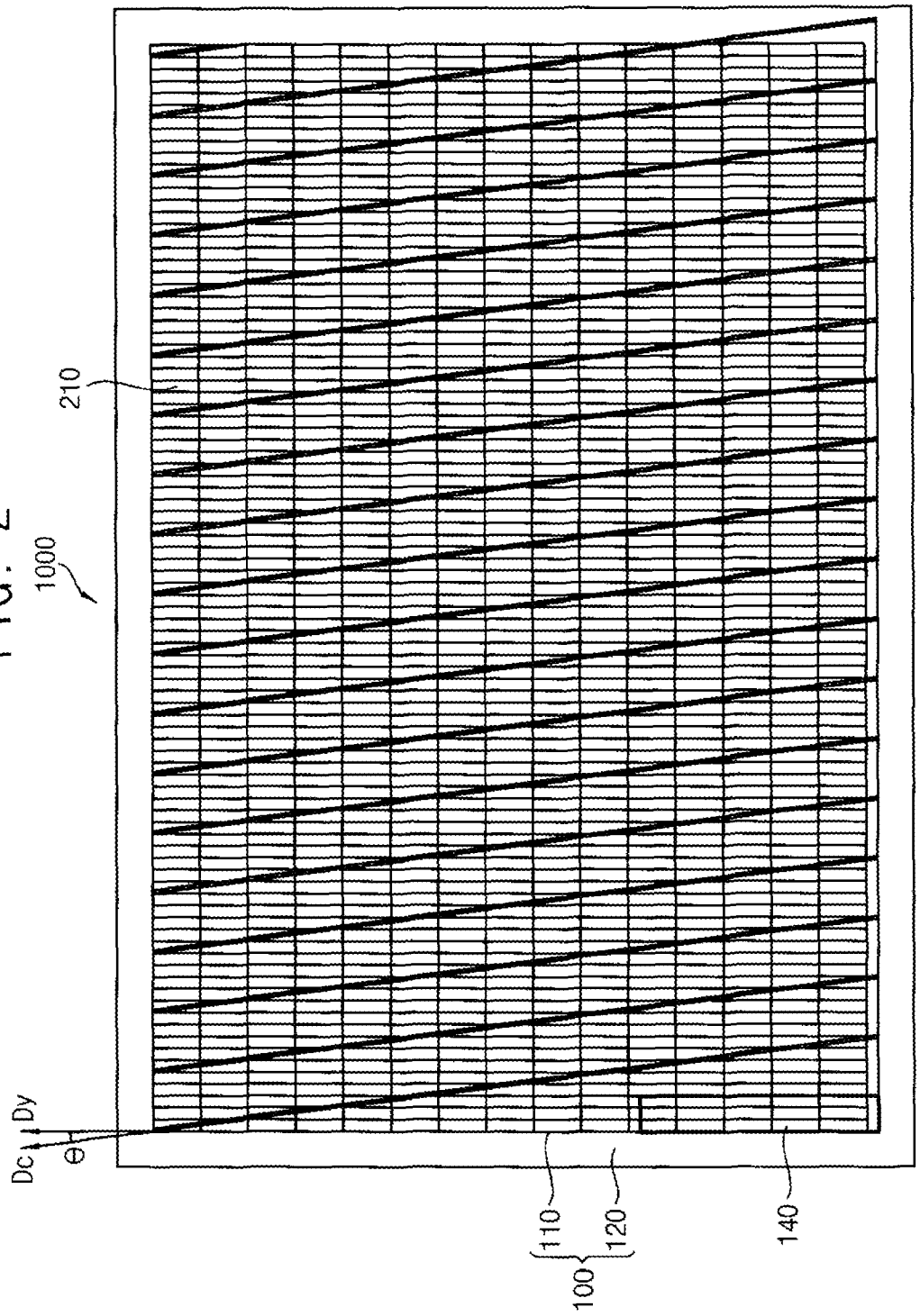
FIG. 2 is a plan view illustrating the display apparatus of FIG. 1.

FIG. 2 is a plan view illustrating the display apparatus of FIG. 1.

Referring to FIG. 2, the extending direction, e.g., an inclined direction Dc, of the light controlling parts 210 are inclined with respect to the vertical direction Dy of the pixels 110 of the pixel part 100 by the predetermined angle θ. As shown in FIG. 2, the pixels 110 are arranged substantially in a matrix form including a unit matrix 140. The unit matrix 140 may include X rows in a horizontal direction and Y columns in the vertical direction. The light controlling parts 210 are disposed along the inclined direction Dc that is inclined with respect to the vertical direction Dy by the predetermined angle of θ. In such an embodiment, the predetermined angle of θ satisfies the following equation: $\theta = \tan^{-1}((M \times X)/(N \times Y))$, in which M and N are natural numbers. In one exemplary embodiment, for example, M and N may be different from each other. In one exemplary embodiment, for example, X may represent number of the pixels in the unit matrix along the horizontal direction, and Y may represent number of the pixels in the unit matrix along the vertical direction. In one exemplary embodiment, for example, M may represent a horizontal length of each pixel, and N may represent a vertical length of the each pixel. In such an embodiment, the predetermined angle θ may be determined based on a diagonal direction of the unit matrix 140 along the unit matrix 140.

In one exemplary embodiment, for example, M and N may be pairwise disjoint, and M/N may be greater than zero (0) and less than ⅓. M may represent the vertical length of the pixel, and N may represent the horizontal length of the pixel. M/N may represent a ratio of a horizontal length with respect to a vertical length of the unit pixel having a rectangular shape. When M/N is greater than zero (0) and less than ⅓, the vertical length of the pixel is equal to or greater than about three times of the horizontal length of the pixel.

Figure 3:
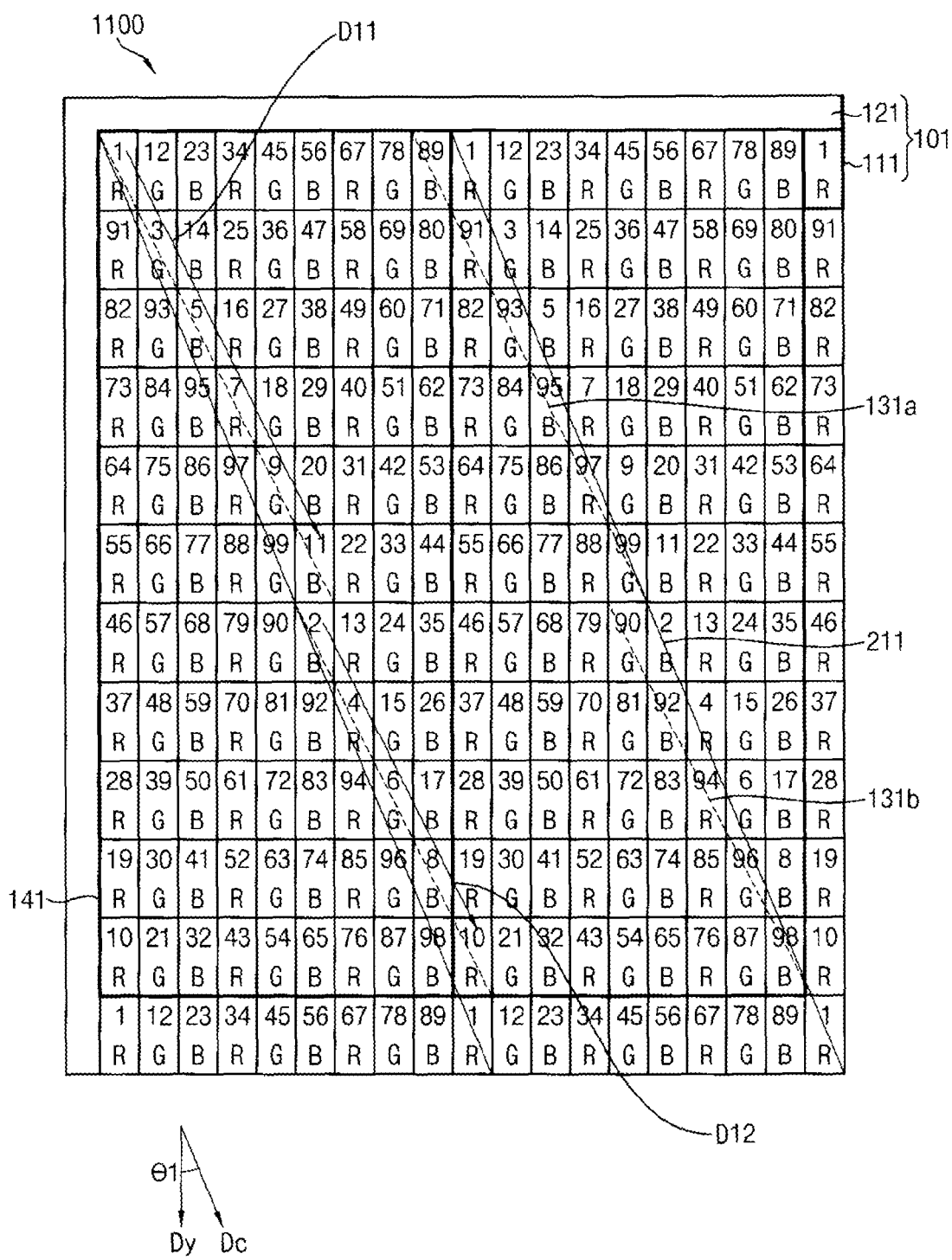
FIG. 3 is a plan view illustrating a portion of an exemplary embodiment of a display apparatus according to the invention.

FIG. 3 is a plan view illustrating a portion of an exemplary embodiment of a display apparatus according to the invention.

Referring to FIG. 3, the display apparatus 1100 includes a pixel part 101 and a plurality of light controlling parts 211. The pixel part 101 includes a plurality of pixels 111 and a peripheral part 121. The pixels 111 are arranged substantially in a matrix form including a unit matrix 141 having 9 columns in the horizontal direction and 11 rows in the vertical direction. In such an embodiment, the number of the pixels 111 in the unit matrix 141 may be 99. Each of the pixels 111 displays a primary color. A plurality of pixels 111 may collectively display one color. In such an embodiment, a ratio of the horizontal direction to the vertical direction of the pixel 111 may be about 1:3.

The inclined direction Dc of the light controlling parts 211 are inclined with respect to the vertical direction Dy of the pixels 111 of the pixel part 101 by the predetermined angle of θ1. In an exemplary embodiment, where the pixels 111 are arranged substantially in a matrix form including a unit matrix 141 having 9 columns in the horizontal direction and 11 rows in the vertical direction, the predetermined angle of θ1 is $\tan^{-1}(3/11)$, that is, about 15.26 degrees.

In the unit matrix 141, adjacent pixels 111 that are adjacent to each other with respect to an imaginary line extending along a longitudinal direction of the light controlling part 211 may be simultaneously displayed to a viewer at a view point. The light controlling part 211 may control light passing therethrough such that the light corresponding to an image displayed on the pixels 111 on the pixel part 101 is focused on the view point of the viewer.

The pixels 111 are arranged with respect to the light controlling part 211, and are arranged along a first pixel sub group 131a and a second pixel sub group 131b. The first and second pixel sub groups 131a and 131b correspond to a pixel arrangement recognized by a viewer. The first and second pixel sub groups 131a and 131b may define one sub group, or may be divided into a plurality of sub groups based on arrangement of the unit matrix 141 of the light controlling part 211.

Referring again to FIG. 3, the light controlling part 211 is inclined with respect to the unit matrix 141, such that an image recognized by the viewer is not corresponding to the unit matrix 141, but corresponding to the light controlling part 211.

In one exemplary embodiment, for example, an image may be displayed according to 1st pixel, 12th pixel, 23rd pixel, 34th pixel, 45th pixel, 56th pixel, 67th pixel, 78th pixel and 89th pixel of the first row in the unit matrix 141. In such an embodiment, the 1st pixel, the 12th pixel, the 23rd pixel, the 34th pixel, the 45th pixel, the 56th pixel, the 67th pixel, the 78th pixel and the 89th pixel are disposed on a main row. In such an embodiment, the 1st pixel, the 12th pixel, the 23rd pixel, the 34th pixel, the 45th pixel, the 56th pixel, the 67th pixel, the 78th pixel and the 89th pixel are main view point pixels that are disposed on the main row and display a main view point.

Remaining pixels in the unit matrix 141 except for the 1st pixel, the 12th pixel, the 23rd pixel, the 34th pixel, the 45th pixel, the 56th pixel, the 67th pixel, the 78th pixel and the 89th pixel are disposed on sub rows except for the main row, and correspond to sub view point pixels that display sub view points.

The 1st pixel, the 12th pixel, the 23rd pixel, the 34th pixel, the 45th pixel, the 56th pixel, the 67th pixel, the 78th pixel and the 89th pixel are disposed in the main row, and display the main view point. The remaining pixels except for the 1st pixel, the 12th pixel, the 23rd pixel, the 34th pixel, the 45th pixel, the 56th pixel, the 67th pixel, the 78th pixel and the 89th pixel display the sub view points.

Referring again to FIG. 3, the pixels display the image with reference to the 1st pixel along an 11th view point direction D11 and a 12th view point direction D12. In one exemplary embodiment, for example, the 1st pixel is disposed on the main row to display the image of the main view point, and remaining pixels except for the 1st pixel are disposed on the sub row to display the images of the sub view points.

The 1st pixel displays the image of the main view point. The 3rd pixel, the 5th pixel, the 7th pixel, the 9th pixel and the 11th pixel display the image of the sub view points along the 11th view point direction D11. The 2nd pixel, the 4th pixel, the 6th pixel, the 8th pixel and the 10th pixel display the sub view points along the 12th view point direction D12. The 2nd to 11th pixels are dislocated with respect to the 1st pixel along an extending direction of the light controlling part 211. When the 2nd to 11th pixels are dislocated with respect to the 1st pixel along the extending direction of the light controlling part 211, the viewer may recognize the image generated by the sub view points between adjacent main view points. Thus, a substantially discontinuous change of view points of a 3-D image may be recognized as substantially a continuous change of view points of the 3-D image.

Figure 4:
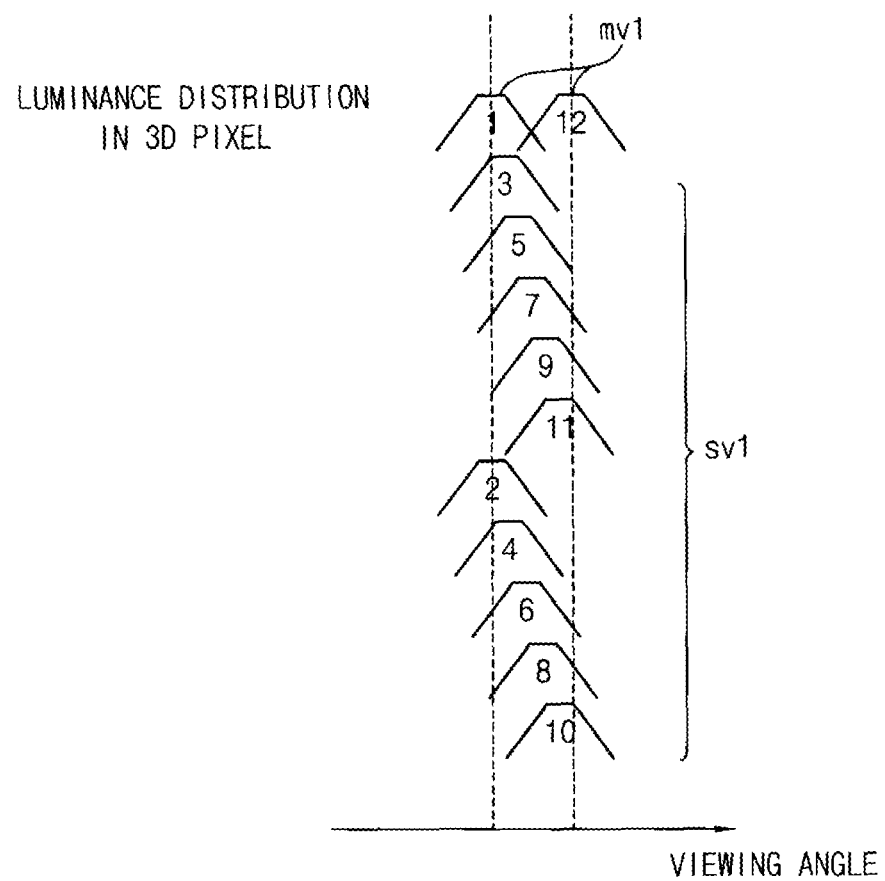
FIG. 4 is a graph illustrating luminance distribution of the display apparatus of FIG. 3.

FIG. 4 is a graph illustrating luminance distribution of a display apparatus of FIG. 3.

Referring to FIG. 4, the luminance distribution of the pixels of the display apparatus of FIG. 3 is illustrated with reference to a view angle. The 1st and 12th pixels display the main view point mv1. The 2nd to 11th pixels display the sub view points sv1. The 1st and 12th pixels corresponding to the main view point mv1 display images with luminance distribution at a reference point. The 2nd to 11th pixels corresponding to the sub view points sv1 display images with luminance distribution at points between adjacent reference points. In an exemplary embodiment, the relative arrangement of the light controlling part 211 with respect to the pixels is not disposed substantially between pixels, but is dislocated such that the 2nd to 11th pixels corresponding to the sub view point sv1 display images having the luminance distribution at the points between the adjacent reference points. Thus, in such an embodiment, the 2nd to 11th pixels corresponding to the sub view point sv1 substantially compensate the discontinuity of the view points between the 1st and 12th pixels corresponding to the main view point mv1. Therefore, the images are displayed substantially continuously on the sub view points disposed between the 1st and 12th pixels corresponding to the main view point mv1, such that Moire that may occur due to the discontinuity of the luminance distribution of the pixels is effectively prevented.

Figure 5:
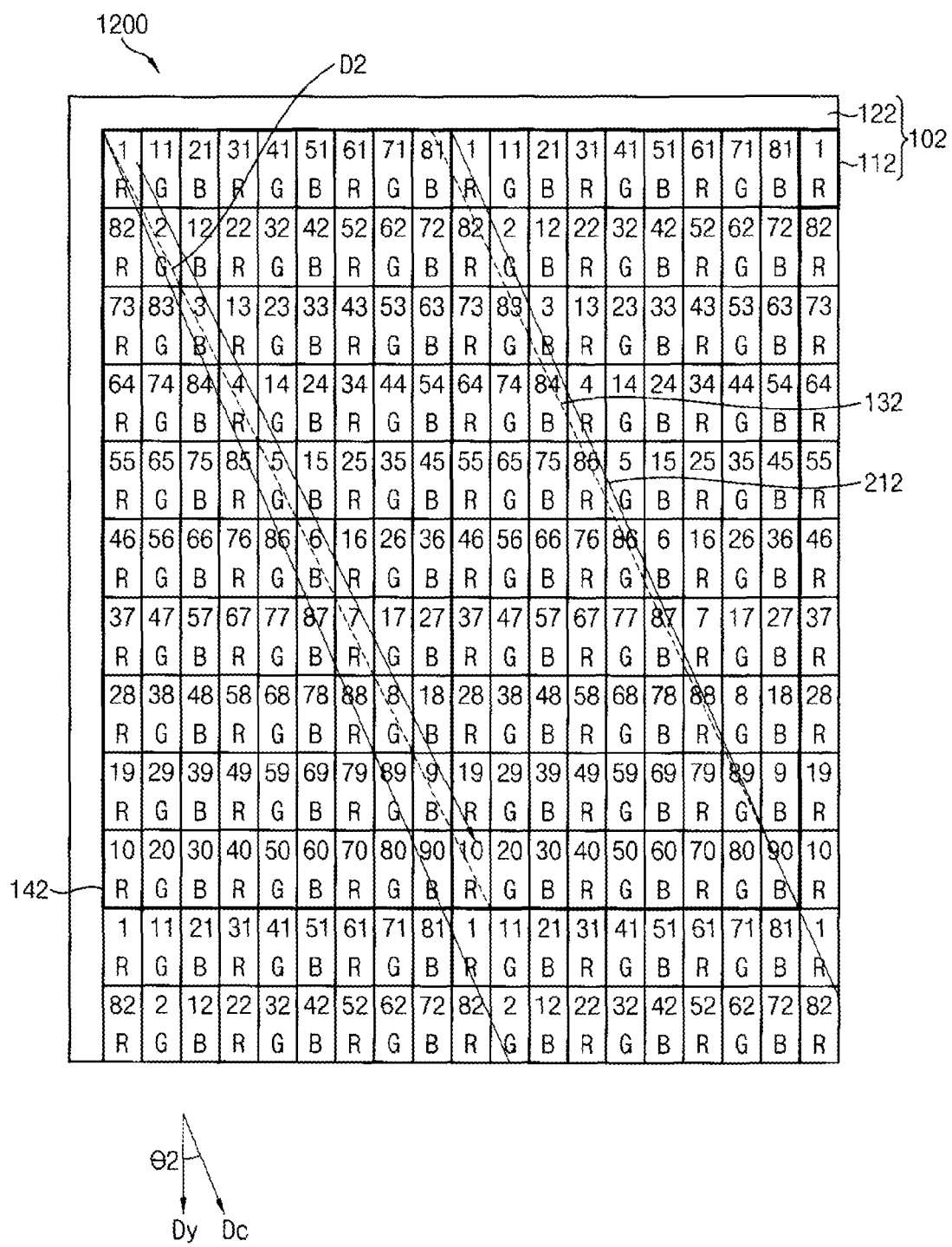
FIG. 5 is a plan view illustrating a portion of an alternative exemplary embodiment of a display apparatus according to the invention.

FIG. 5 is a plan view illustrating a portion of an alternative exemplary embodiment of a display apparatus according to the invention.

Referring to FIG. 5, the display apparatus 1200 includes a pixel part 102 and a plurality of light controlling parts 212. The pixel part 102 includes a plurality of pixels 112 and a peripheral part 122. The pixels 112 are arranged substantially in a matrix form having a unit matrix 142 including 9 columns in a horizontal direction and 10 rows in a vertical direction. Thus, in such an embodiment, the number of the pixels 112 in the unit matrix 142 may be 90. Each of the pixels 112 displays a primary color. A plurality of pixels 112 may collectively display one color. In such an embodiment, a ratio of the horizontal direction to the vertical direction of the pixel 112 may be about 1:3. An inclined direction Dc of the light controlling parts 212 are inclined with respect to the vertical direction Dy of the pixels 112 of the pixel part 102 by the predetermined angle of θ2. In such an embodiment, the predetermined angle of θ2 is $\tan^{-1}(3/10)$, that is, about 16.7 degrees. The display apparatus 1200 of FIG. 5 is substantially the same as the display apparatus 1100 shown in FIG. 3 except for the predetermined angle. Thus, any repetitive detailed description of the same or like elements will hereinafter be omitted. When the predetermined angle is changed, distribution of the pixels 112 displayed by the light controlling part 212 is changed.

In the unit matrix 142, adjacent pixels 112 that are adjacent to each other with respect to an imaginary line extending along a longitudinal direction of the light controlling part 212 may be simultaneously displayed to a viewer at a view point. The light controlling part 212 may control light passing therethrough such that the light corresponding to an image displayed on the pixels 112 on the pixel part 102 is focused on the view point of the viewer.

The pixels 112 are arranged with respect to the light controlling part 212, and are arranged along a pixel sub group 132. In FIG. 5, the inclined angle of the light controlling part 212 is different from the inclined angle of FIG. 3. All of the pixels in the unit matrix 142 may be disposed in one pixel sub group. The pixel sub group 132 corresponds to a pixel arrangement based on recognition of a viewer.

Referring again to FIG. 5, the light controlling part 212 is inclined with respect to the unit matrix 142, such that an image recognized by the viewer is not corresponding to the unit matrix 142, but corresponding to the pixel sub group 132.

In one exemplary embodiment, for example, an image may be displayed according to 1st pixel, 11th pixel, 21st pixel, 31st pixel, 41st pixel, 51st pixel, 61st pixel, 71st pixel and 81st pixel of the first row in the unit matrix 142. The 1st pixel, the 11th pixel, the 21st pixel, the 31st pixel, the 41st pixel, the 51st pixel, the 61st pixel, the 71st pixel and the 81st pixel are disposed on a main row, and correspond to a main view point pixels that are disposed on the main row and displays a main view point.

Remaining pixels in the unit matrix except for the 1st pixel, the 11th pixel, the 21st pixel, the 31st pixel, the 41st pixel, the 51st pixel, the 61st pixel, the 71st pixel and the 81st pixel disposed on a sub row except for the main row in the unit matrix 142, and correspond to sub view point pixels that display sub view points.

The 1st pixel, the 11th pixel, the 21st pixel, the 31st pixel, the 41st pixel, the 51st pixel, the 61st pixel, the 71st pixel and the 81st pixel are disposed in the main row, and display the main view point. The remaining pixels except for the 1st pixel the 11th pixel, the 21st pixel, the 31st pixel, the 41st pixel, the 51st pixel, the 61st pixel, the 71st pixel and the 81st pixel display the sub view points.

Referring again to FIG. 5, the pixels display the image with reference to the 1st pixel along a 2nd view point direction D2. In one exemplary embodiment, for example, the 1st pixel is disposed on the main row to display the image of the main view point, and remaining pixels except for the 1st pixel are disposed on the sub rows to display the images of the sub view points.

The 1st pixel displays the image of the main view point. The 2nd pixel, the 3rd pixel, the 4th pixel, the 5th pixel, the 6th pixel, the 7th pixel, the 8th pixel, the 9th pixel and the 10th pixel display the image of the sub view points along the 2nd view point direction D2. The 2nd to 10th pixels are dislocated with respect to the 1st pixel along an extending direction of the light controlling part 212. When the 2nd to 10th pixels are dislocated with respect to the 1st pixel along the extending direction of the light controlling part 212, the viewer may recognize the image displayed by the sub view points between adjacent main view points. Thus, a substantially discontinuous change of view points of a 3-D image may be changed into a substantially continuous change of view points of the 3-D image.

FIG. 6 is a graph illustrating luminance distribution of a display apparatus of FIG. 5.

Referring to FIG. 6, the luminance distribution of the pixels of the display apparatus of FIG. 5 is illustrated with reference to a view angle. The 1st and 11th pixels display the main view point mv2. The 2nd to 10th pixels display the sub view points sv2. The 1st and 11th pixels corresponding to the main view point mv2 display an image with luminance distribution at a reference point. The 2nd to 10th pixels corresponding to the sub view point sv2 display images with luminance distribution between adjacent reference points. In such an embodiment, the relative arrangement of the light controlling part 212 with respect to the pixels is not disposed substantially between pixels, but is dislocated such that the 2nd to 10th pixels corresponding to the sub view points sv2 display the images with luminance distribution between the adjacent reference points. Thus, the 2nd to 10th pixels corresponding to the sub view points sv2 effectively compensate the discontinuity of the view points between the 1st and 11th pixels corresponding to the main view point mv2. Therefore, continuous images are displayed substantially continuously on the sub view points disposed between the 1st and 11th pixels corresponding to the main view point mv2, such that Moire that may occur due to the discontinuity of the luminance distribution of the pixels is effectively prevented.

Figure 7A:
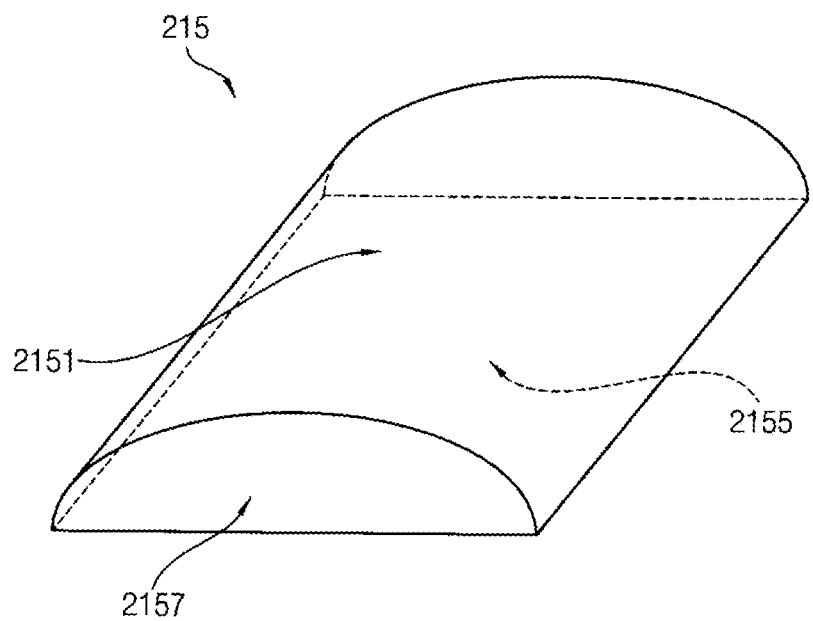
FIGS. 7A to 7C are perspective views of exemplary embodiments of a light controlling part according to the invention.
Figure 7B:
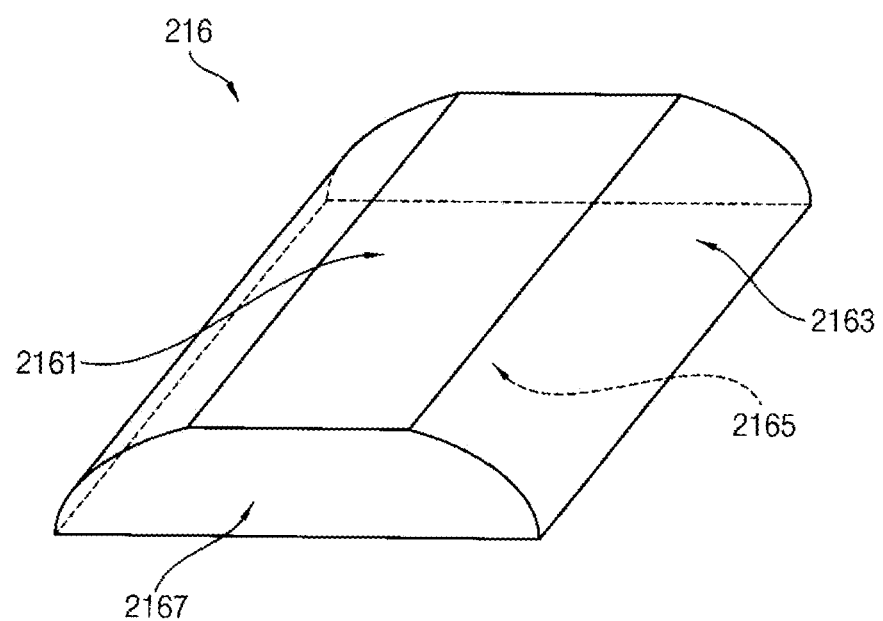
Figure 7C:
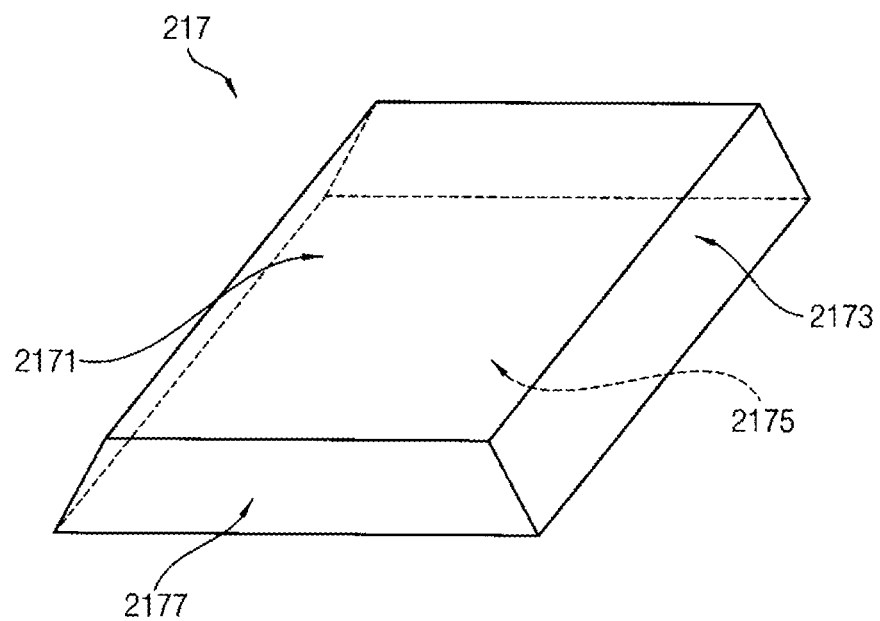

FIGS. 7A to 7C are perspective views illustrating exemplary embodiments of a light controlling part according to the invention. FIG. 7A is a perspective view illustrating an exemplary embodiment of a light controlling part according to the invention.

Referring to FIG. 7A, the light controlling part 215 includes a bottom portion 2155 and a curved portion 2151. The curved portion 2151 is disposed on the bottom portion 2155. The light controlling part 215 may further include a side portion 2157 that connects the bottom portion 2155 and the curved portion 2151. The curved portion 2151 of the light controlling part 215 controls images that are provided under the light controlling part 215 into a view point of a viewer. The curved portion 2151 may have a lens shape, and a focal length of the curved portion 2151 may be determined based on a distance between the bottom portion 2155 of the light controlling part 215 and a display panel and a distance between the display panel and the viewer, for example.

FIG. 7B is a perspective view illustrating an alternative exemplary embodiment of a light controlling part according to the invention.

Referring to FIG. 7B, the light controlling part 216 includes a bottom portion 2165 and a curved portion 2163. The curved portion 2161 is disposed on the bottom portion 2165. The light controlling part 216 may further include a flat portion 2161 disposed on the curved portion 2163. The light controlling part 216 may further include a side portion 2167 that connects the bottom portion 2165 and the flat portion 2161. The curved portion 2163 of the light controlling part 216 controls images that are provided under the light controlling part 216 into a view point of a viewer. The curved portion 2163 may include the flat portion 2161 on top of the curved portion 2163. A distance between the bottom portion 2165 and the flat portion 2161 and a focal length of the curved portion 2163 may be determined based on a distance between the bottom portion 2165 of the light controlling part 216 and a display panel and a distance between the display panel and the viewer, for example.

FIG. 7C is a perspective view illustrating another alternative exemplary embodiment of a light controlling part according to the invention.

Referring to FIG. 7C, the light controlling part 217 includes a bottom portion 2175, a side flat portion 2173 and an upper flat portion 2171. The light controlling part 217 may further include a side portion 2177 that connects the bottom portion 2175 and the side flat portion 2173. The side flat portion 2173 and the upper flat portion 2171 of the light controlling part 217 controls images that are provided under the light controlling part 217 into a view point of a viewer. Height and width of the side flat portion 2173 and the upper flat portion 2171 may be determined based on a distance between the bottom portion 2175 of the light controlling part 217 and a display panel and a distance between the display panel and the viewer, for example.

Figure 8:
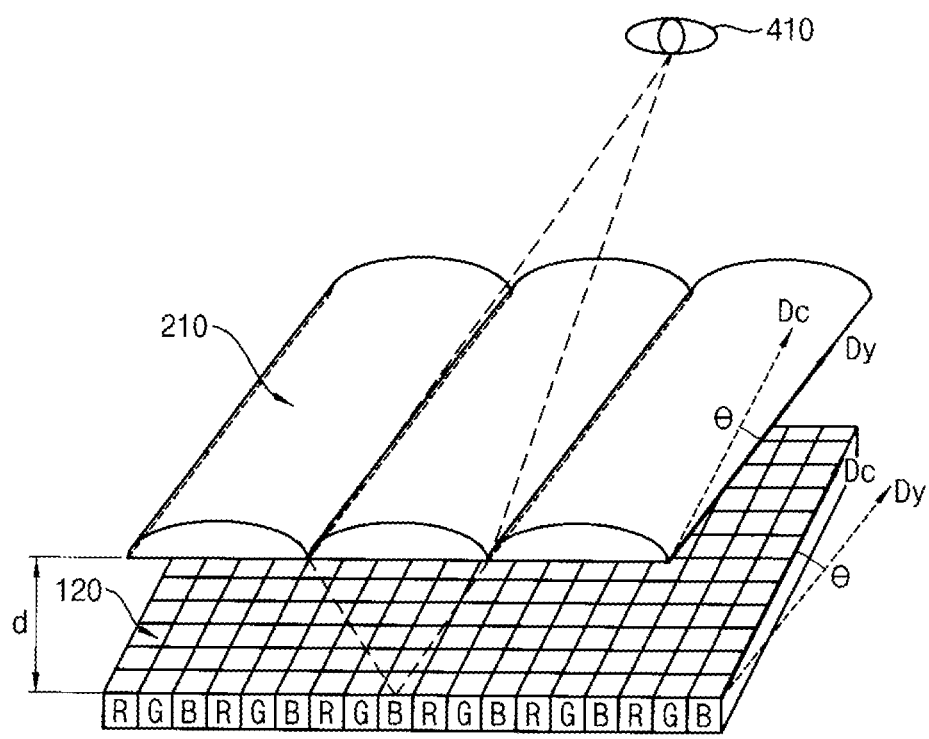
FIG. 8 is a perspective view illustrating a light path of an exemplary embodiment of a display apparatus according to the invention.

FIG. 8 is a perspective view illustrating a light path of an exemplary embodiment of a display apparatus according to the invention.

Referring to FIG. 8, the display apparatus includes a pixel part 120 and a plurality of light controlling parts 210 disposed on the pixel part 120. The pixel part 120 includes a plurality of pixels. The light controlling parts 210 are arranged in an inclined direction Dc, e.g., a light controlling direction, which is inclined with respect to a vertical direction Dy of the pixel part 100 by a predetermined angle θ. In such an embodiment, the pixel part 120 is inclined with respect to the light controlling part 210 by the predetermined angle θ. The pixel part 120 is spaced apart from the light controlling part 210 with a first interval d. The first interval d may be changed based on a distance between the display apparatus and a view point 410 of a viewer. In an exemplary embodiment, the first interval d may be controlled by an interval controlling device (not shown) interposed between the pixel part 120 and the light controlling part 210. In an alternative exemplary embodiment, the display apparatus may further include a diffusion plate interposed between the pixel part 120 and the light controlling parts 210.

In an exemplary embodiment, the light controlling parts 210 are arranged in the light controlling direction Dc that is inclined with respect to the vertical direction Dy of the pixel part 120 by the predetermined angle θ. In an exemplary embodiment, the light controlling parts 210 are arranged substantially parallel to each other such that an image may be viewed by a viewer when the view point 410 of the viewer is changed.

Figure 9A:
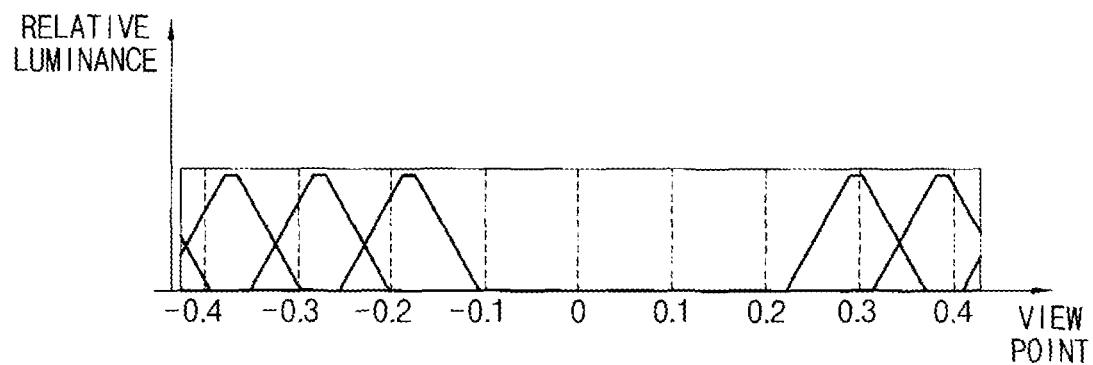
FIGS. 9A and 9B are graphs illustrating pixel periods with respect to angles of embodiments of a 3-D display apparatus including a light controlling part.
Figure 9B:
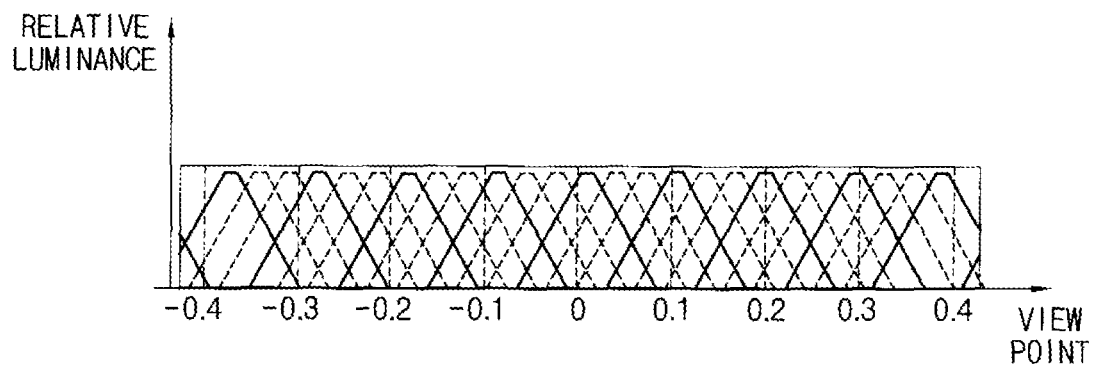

FIGS. 9A and 9B are graphs illustrating pixel periods with respect to angles of a 3-D display apparatus including a light controlling part.

Referring to FIG. 9A, the graph illustrates a pixel period of a 3-D image of a 3-D display apparatus including a comparative embodiment of a light controlling part, in which the pixel part is not inclined with respect to the light controlling part. A pixel image of the 3-D image of FIG. 9A are periodically arranged at various view points. In the comparative embodiment, the pixel image of the 3-D image of FIG. 9A has main view points, in which pixels are uniformly repeated to display the 3-D image. When a viewer views the display apparatus at a predetermined view point, the viewer may recognize a predetermined image. When the viewer views the display apparatus at different view points, the viewer may not recognize the predetermined image or may recognize overlapping images at adjacent view points. In the comparative embodiment, the viewer may only recognize the predetermined image at a predetermined position at the predetermined view point, and interference of the overlapping images and a black image at the different view points may be recognized by the viewer. Accordingly, Moire may be displayed to the viewer in the comparative embodiment, such that display quality of the 3-D image may be deteriorated.

Referring to FIG. 9B, the graph illustrates a pixel period of a 3-D image of an exemplary embodiment of a 3-D display apparatus according to the invention. FIG. 9B illustrates the pixel images of an exemplary embodiment of the display apparatus of FIGS. 1 to 8, which are periodically displayed. The display apparatus simultaneously displays images of a main view point and sub view points. Thus, the main view point and the sub view points are mixed at each pixel to display the image, when the view points displayed by the each pixel are arranged with a constant interval. Therefore, an image of uniform luminance may be displayed to the viewer, when the viewer may not be at a predetermined position corresponding to the main view point. In such an embodiment, the images of the sub view points are adjusted based on images of adjacent main view points such that the change of the image between the view points may not be recognized by the viewer. In such an embodiment, periodical distribution of the images at different view points may not be recognized by the viewer, such that Moire is effectively prevented.

Figure 10A:
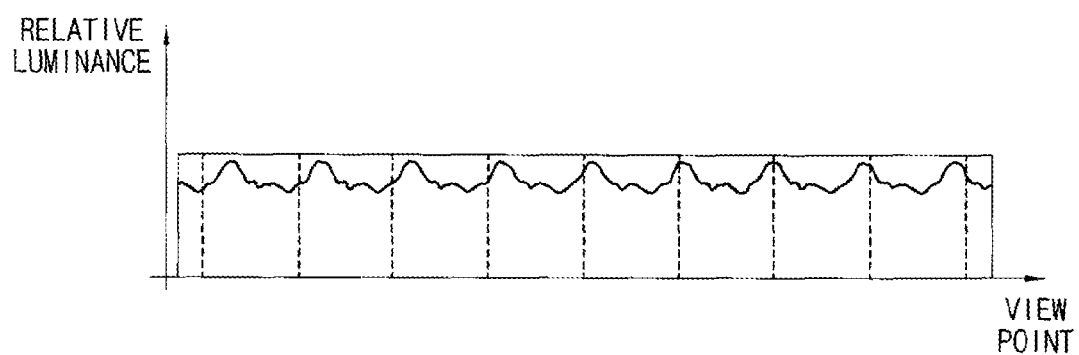
FIGS. 10A and 10B are graphs illustrating luminance distribution with respect to viewing angles of a 3-D display apparatus including a light controlling part.
Figure 10B:
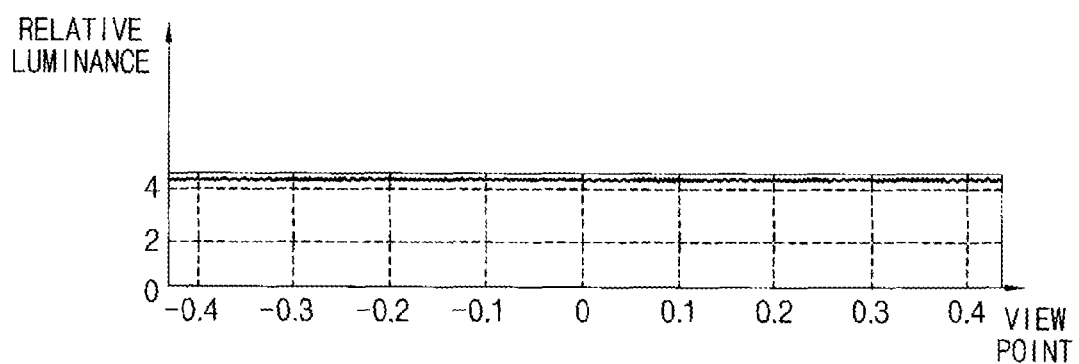

FIGS. 10A and 10B are graphs illustrating luminance distribution with respect to viewing angles of a 3-D display apparatus including a light controlling part.

Referring to FIG. 10A, the graph illustrates a luminance distribution based on a viewing angle of a 3-D image display apparatus including a comparative embodiment of the light controlling part, in which the pixel part is not inclined with respect to the light controlling part. As shown in FIG. 10A, luminances of pixels of the 3-D display apparatus are overlapping each other, and luminance distribution is non-uniform. In the comparative embodiment, the 3-D display apparatus displays the 3-D image only at a main view point, such that the distribution of the 3-D image is periodical with respect to the view angle. Thus, the luminance of a high luminance region is further increased, and the difference in the luminance of a high luminance region and the luminance of a low luminance region is further increased.

The luminance distribution is illustrated by Just Noticeable Difference Index ("JNDi"). When JNDi is less than 1, human eyes may not recognize the difference of the luminance. JNDi of the 3-D display apparatus of FIG. 10A is about 14.73, such that the luminance difference within a range recognizable by a human, and a viewer may recognize the change of the luminance at different view points.

Referring to FIG. 10B, a luminance distribution based on a viewing angle of an exemplary embodiment of a 3-D image display apparatus according to the invention. FIG. 10B may illustrate the luminance distribution of the display apparatus of FIGS. 1 to 8. The display apparatus has a pixel period at which the luminance distribution is periodically changed. Thus, uniformity of the luminance distribution, which is the summation of the luminance of the pixels, is increased. The display apparatus simultaneously displays the images of the main view point and the sub view points such that the distribution of the images at various view angles is continuously changed.

JNDi of the display apparatus of FIG. 10B is about 0.43. The JNDi of the display apparatus of FIG. 10B is less than 1, such that the change of luminances of the display apparatus of FIG. 10B may not be recognized by a viewer. In such an embodiment, the viewer recognizes uniform images without luminance change at various view points.

Figure 11:
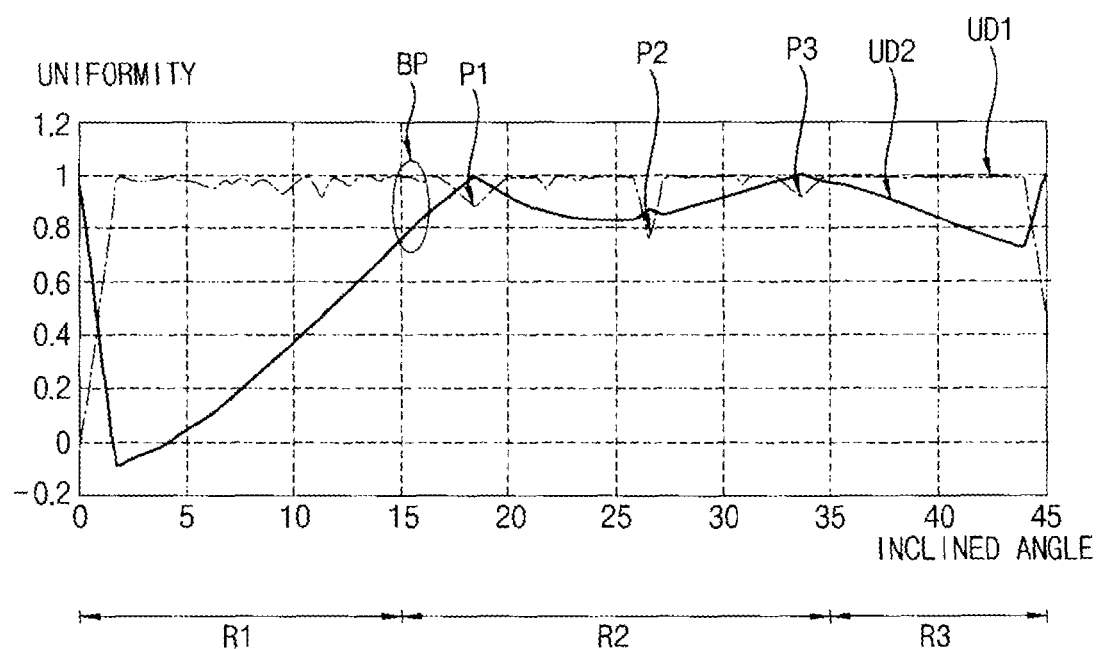
FIG. 11 is a graph illustrating luminance uniformity with respect to angle and location of an exemplary embodiment of a display apparatus according to the invention.

FIG. 11 is a graph illustrating luminance uniformity with respect to angle and location of an exemplary embodiment of a display apparatus according to the invention.

Referring to FIG. 11, when an inclined angle $\theta$ is changed in the display apparatus including the light controlling part, the luminance uniformity according to various angles and the luminance uniformity according to various locations are changed. The inclined angle $\theta$ represents an inclined angle of the light controlling part with respect to the pixel part, e.g., a vertical direction of pixels in the pixel part, of the display apparatus. The luminance uniformity according to the various angles is represented by view point uniformity UD1. The luminance uniformity according to the various locations is represented by location uniformity UD2. The view point uniformity UD1 represents luminance uniformity at the various view points, and represents luminance uniformity corresponding to view point change in a right-left direction (i.e. a horizontal direction) of a viewer. The location uniformity UD2 represents luminance uniformity at the various locations of the viewer, and represents luminance uniformity corresponding to view point change in an up-down direction (i.e. a vertical direction) of a viewer.

When the inclined angle $\theta$ is about zero (0) degree, the light controlling part is arranged substantially perpendicular to the pixels, and the location uniformity UD2 has the highest value, while the view point uniformity UD1 has the lowest value. That is, the luminance uniformity of the image is the lowest with respect to view point change of the viewer. Although the luminance uniformity in the vertical direction is substantially high, the viewer may recognize Moire by the luminance non-uniformity in the horizontal direction.

The inclined angle $\theta$ is about zero (0) degree to about 15 degrees in a first period R1. The view point luminance UD1 has substantially high uniformity, while the location uniformity UD2 has substantially low uniformity in the first period R1. When the inclined angle $\theta$ is increased, the location uniformity UD2 is increased. However, the luminance uniformity in the first period R1 is substantially low such that the viewer may not recognize an image of uniform luminance.

The inclined angle $\theta$ is about 35 degree to about 45 degrees in a third period R3. The view point luminance UD1 has high uniformity, while the location uniformity UD2 has also poor uniformity in the third period R3. When the inclined angle $\theta$ is increased, the location uniformity UD2 is decreased.

When the inclined angle θ is about 45 degrees, the light controlling part is inclined with respect to the pixels at an angle of about 45 degrees. The location luminance UD2 has the highest uniformity, while the view point uniformity UD1 has a substantially low uniformity at the inclined angle θ of about 45 degrees.

The inclined angle θ is about 15 degree to about 35 degrees in a second period R2. The view point luminance UD1 and the location uniformity UD2 have substantially high uniformity in the second period R2. However, the view point uniformity UD1 is decreased at several points P1, P2 and P3 during the second period R2. When the view point uniformity UD1 is decreased at several points P1, P2 and P3, the pixel periods are temporarily substantially the same so that the luminance distribution based on the view points of the viewer is non-uniform. When the view point uniformity UD1 is low, Moire may be displayed to the viewer.

An inclined angle θ of an optimal point BP may be acquired using the equation: $\theta=\tan^{-1}((M\times X)/(N\times Y))$, as described above. In such an embodiment, the inclined angle θ of an optimal point BP is $\tan^{-1}(3/11)$, that is, about 15.26 degrees. The view point uniformity UD1 has the maximum value at the optimal point BP, and the location uniformity UD2 is about 0.8 at the optimal point BP. Thus, the view point uniformity and the location uniformity are substantially high at the optimal point BP, and the viewer may not recognize the change of luminance. Therefore, Moire is effectively prevented from being recognized by the viewer, and display quality of a 3-D image is thereby substantially improved at the inclined angle θ of an optimal point BP.

Figure 12:
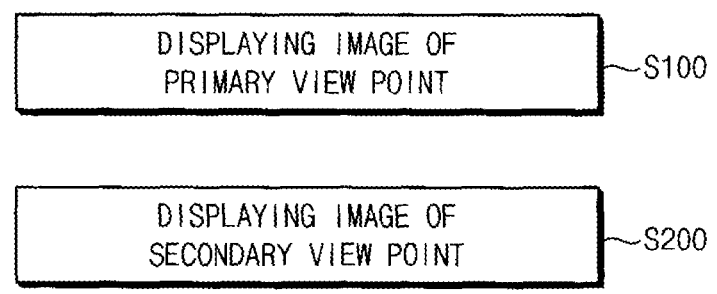
FIG. 12 is a flow chart illustrating an exemplary embodiment of a method of driving a display apparatus according to the invention.

FIG. 12 is a flow chart illustrating an exemplary embodiment of a method of driving a display apparatus according to the invention.

Referring to FIG. 12, according to an exemplary embodiment of the method of driving the display apparatus, a main view point image is displayed (S100). A sub view point image is displayed (S200). In a comparative embodiment, where all of pixels thereof display only the main view point image, luminance non-uniformity is displayed at various view points, such that Moire is recognized.

In an exemplary embodiment of the method of driving the display apparatus, the display apparatus includes a pixel part and a light controlling part. The pixel part includes a plurality of pixels arranged in a unit matrix form having X columns in a horizontal direction and Y rows in a vertical direction. In such an embodiment, the light controlling part is inclined with respect to a vertical direction of the pixels of the pixel part by an inclined angle θ. The inclined angle θ is represented by an equation of $\theta=\tan-1((M\times X)/(N\times Y))$, where M and N are natural number. A ratio of M with respect to N may be about 1:3, and a ratio of X with respect to Y may be about 9:11. Thus, the inclined angle θ may be $\tan-1(3/11)$, that is, about 15.26 degrees.

In S100, the main view point image is displayed using a pixel disposed on an uppermost row of the unit matrix. The uppermost row may be a main row, and remaining rows of the unit matrix may be sub rows. In S200, the sub view point images are displayed on pixels disposed in the sub rows.

Therefore, the pixels of the display apparatus display the main view point and the sub view points on the pixels. Thus, the pixel period of the pixels are substantially non-constant with respect to the change of view points, and have changed locations. Therefore, an image having uniform luminance with respect to the change of the view points of the viewer, and Moire that may be caused by luminance non-uniformity is effectively prevented.

According to the exemplary embodiments described above, the 3-D display apparatus includes the pixel part and the light controlling part inclined with respect to the pixel part by a predetermined angle. The light controlling part controls the image period of the image displayed to a viewer to be continuously changed with respect to each view point such that the image displayed to the viewer has uniform luminance distribution. Thus, Moire is effectively prevented from being recognized by the viewer.

In such embodiments, the image at the main view point and the image at the sub view point are simultaneously displayed to the viewer, such that the viewer may not perceive the change of luminance in different view points. Thus, in such embodiments, image display quality is substantially improved.

It will be apparent to those skilled in the art that various modifications and variation can be made in the invention without departing from the spirit or scope of the invention. Thus, it is intended that the invention cover the modifications and variations of this invention provided they come within the scope of the appended claims and their equivalents.

What is claimed is:

1. A display apparatus comprising:
a pixel part comprising a plurality of pixels arranged substantially in a matrix form, wherein the matrix form comprises a unit matrix having X columns in a horizontal direction and Y rows in a vertical direction, wherein X and Y are natural numbers and a ratio of X with respect to Y is 9:11 or 9:10; and
a plurality of light controlling parts inclined with respect to the vertical direction of the pixels on the pixel part at an inclined angle of θ,
wherein the inclined angle of θ satisfies the following equation:

$$\theta=\tan^{-1}((M\times X)/(N\times Y)),$$

wherein M and N are different natural numbers measured along horizontal and vertical directions of a pixel respectively; and wherein M/N is greater than zero (0) and is less than or equal to ⅓, and
wherein the pixels are arranged with respect to the light controlling parts and arranged along a first pixel sub group and a second pixel sub group.

2. The display apparatus of claim 1, wherein M and N are pairwise disjoint.

3. The display apparatus of claim 1, wherein a ratio of M with respect to N is 1:3.

4. The display apparatus of claim 1, wherein a ratio of X×M with respect to Y×N is 3:11.

5. The display apparatus of claim 1, wherein each pixel of the pixel part has a substantially rectangular shape extending substantially in the vertical direction.

6. The display apparatus of claim 5, wherein a ratio of a horizontal length with respect to a vertical length of the each pixel of the pixel part is 1:3.

7. The display apparatus of claim 1, wherein the pixel part is spaced apart from the light controlling parts.

8. The display apparatus of claim 1, wherein the light controlling parts are arranged substantially parallel to each other.

9. The display apparatus of claim 8, wherein each of the light controlling parts comprises a bottom portion, and a curved portion disposed on the bottom portion.

10. The display apparatus of claim 9, wherein each of the light controlling parts further comprises a flat portion disposed on the curved portion.

11. The display apparatus of claim 8, wherein each of the light controlling parts comprises a bottom portion, a side flat portion and an upper flat portion.

12. The display apparatus of claim 1, further comprising a diffusion plate interposed between the pixel part and the light controlling parts.

13. A method of driving a display apparatus, the method comprising:
   displaying a main view point image on a pixel in a main row of a unit matrix; and
   displaying a sub view point image on pixels in sub rows of the unit matrix, wherein the sub rows are remaining rows of the unit matrix except the main row,
   wherein the display apparatus comprises:
   a pixel part comprising a plurality of pixels arranged substantially in a matrix form, wherein the matrix form comprises the unit matrix having X columns in a horizontal direction and Y rows in a vertical direction, and X and Y are natural numbers and a ratio of X with respect to Y is 9:11 or 9:10; and
   a plurality of light controlling parts inclined with respect to the vertical direction of the pixels on the pixel part by an inclined angle of $\theta$, and wherein the inclined angle of $\theta$ satisfies the following equation:

$$\theta = \tan^{-1}((M \times X)/(N \times Y)),$$

wherein M and N are different natural numbers measured along horizontal and vertical directions of a pixel respectively, and wherein M/N is greater than zero (0) and is less than or equal to $\frac{1}{3}$, wherein the pixels are arranged with respect to the light controlling parts and arranged along a first pixel sub group and a second pixel sub group.

14. The method of claim 13, wherein the main row is a first row of the unit matrix.

15. The method of claim 13, wherein the pixels which display the sub view point image are disposed along an imaginary line passing a pixel which displays the main view point image in the main row and inclined with respect to vertical direction by the inclined angle of $\theta$.

16. The method of claim 13, wherein a ratio of M with respect to N is 1:3.

17. The method of claim 16, wherein a ratio of X with respect to Y is 9:11.

18. The method of claim 13, wherein a ratio of X×M with respect to Y×N is 3:11.

* * * * *